(12) United States Patent
Compton et al.

(10) Patent No.: US 9,658,354 B2
(45) Date of Patent: May 23, 2017

(54) SEISMIC IMAGING SYSTEMS AND METHODS EMPLOYING CORRELATION-BASED STACKING

(75) Inventors: Stefan M. Compton, Littleton, CO (US); Christof Stork, Denver, CO (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 293 days.

(21) Appl. No.: 14/356,479

(22) PCT Filed: Nov. 7, 2011

(86) PCT No.: PCT/US2011/059535
§ 371 (c)(1),
(2), (4) Date: May 6, 2014

(87) PCT Pub. No.: WO2013/070183
PCT Pub. Date: May 16, 2013

(65) Prior Publication Data
US 2014/0293740 A1    Oct. 2, 2014

(51) Int. Cl.
*G01V 1/34* (2006.01)
*G01V 1/36* (2006.01)

(52) U.S. Cl.
CPC .............. *G01V 1/345* (2013.01); *G01V 1/362* (2013.01); *G01V 1/366* (2013.01);
(Continued)

(58) Field of Classification Search
None
See application file for complete search history.

(56) References Cited

U.S. PATENT DOCUMENTS 4,813,027 A    3/1989   Tieman
5,500,832 A    3/1996   Berryhill
(Continued)

FOREIGN PATENT DOCUMENTS

WO    WO-2013/070183    5/2013

OTHER PUBLICATIONS

PCT International Search Report and Written Opinion, dated Feb. 15, 2012, Appl No. PCT/US2011/059535, "Seismic Imaging Systems and Methods Employing Correlation-Based Stacking", filed Nov. 7, 2011, 7 pgs.
(Continued)

*Primary Examiner* — Luke Ratcliffe
*Assistant Examiner* — Amienatta M Ndure Jobe
(74) *Attorney, Agent, or Firm* — Iselin Law PLLC; Alan Bryson

(57) ABSTRACT

Disclosed systems and methods provide enhanced seismic images through the use of partial image stacking weights that are based on the resemblance between the local partial image and a reference image. At least some method embodiments include obtaining partial images of a survey region and stacking the partial images to produce a reference image. The partial images are then recombined to form an enhanced image, wherein the recombining includes: measuring at each point the reference image's similitude with each of the partial images; and determining at each point an enhanced image value from a weighted combination of corresponding values in the partial images, the weighted combination using weights derived from the reference images' similitude at that point to each partial image.

15 Claims, 5 Drawing Sheets

(52) U.S. Cl.
CPC .... *G01V 2210/32* (2013.01); *G01V 2210/322* (2013.01); *G01V 2210/74* (2013.01)

(56) References Cited

U.S. PATENT DOCUMENTS

| | | | | |
|---|---|---|---|---|
| 5,764,059 | A | * | 6/1998 | Mansfield .......... G01R 33/3854 324/318 |
| 5,784,334 | A | | 7/1998 | Sena et al. |
| 6,988,038 | B2 | * | 1/2006 | Trappe .................. G06F 17/18 702/17 |
| 7,720,609 | B2 | | 5/2010 | Meldahl |
| 7,859,942 | B2 | | 12/2010 | Stork |
| 8,207,886 | B2 | | 6/2012 | Chambers et al. |
| 2003/0112704 | A1 | | 6/2003 | Goff et al. |
| 2004/0093163 | A1 | | 5/2004 | Reshef et al. |
| 2004/0196739 | A1 | | 10/2004 | Daube et al. |
| 2004/0210394 | A1 | * | 10/2004 | Trappe .................. G06F 17/18 702/14 |
| 2004/0220744 | A1 | * | 11/2004 | Voutay .................... G01V 1/32 702/14 |
| 2004/0267499 | A1 | * | 12/2004 | Barnes ................... G01V 1/288 702/179 |
| 2010/0074053 | A1 | | 3/2010 | Jaiswal et al. |
| 2010/0092106 | A1 | | 4/2010 | Simon |
| 2014/0112099 | A1 | | 4/2014 | Hofland et al. |

OTHER PUBLICATIONS

Claerbout, Jon F., "Seismic Data Processing with the Wave Equation", Fundamentals of Geophysical Data Processing with Application to Petroleum Prospecting, 1985, p. 246-256, Blackwell Scientific Publications, Palo Alto, California, USA.

Nemeth, Tamas, "Tomographic Migration Velocity Analysis on a Salt Model", 1995, UTAM Midyear Report 1.

Claerbout, Jon F., "Chapter 1: Introduction to Imaging", Imaging the Earth's Interior, 1985, p. 1-75, Blackwell Scientific Publications, Palo Alto, California, USA.

Hung, Barry et al., "Optimal Stacking for Multi-Azimuth Pre-Stack Seismic Data", 22nd ASEG Conference and Exhibition, Feb. 26-29, 2012, 4 pgs., Brisbane, Australia.

Liu, Guochang et al., "Stacking Seismic Data Using Local Correlation", Geophysics, 74, 2009, 13 pgs., No. 3, V43-V48.

CN First Office Action, dated Dec. 18, 2015, "Seismic Imaging Systems and Methods Employing Correlation-Based Stacking," filed Nov. 7, 2011 Appln. No. 201180074194.4, 14 pgs.

CN Second Office Action, dated Jul. 12, 2016, "Seismic Imaging Systems and Methods Employing Correlation-Based Stacking," filed Nov. 7, 2011 Appln. No. 201180074194.4, 19 pgs.

CA Office Action, dated Sep. 9, 2016, "Seismic Imaging Systems and Methods Employing Correlation-Based Stacking," filed Nov. 7, 2011 Appln. No. 2,850,298, 4 pgs.

EP Extended Search Report, dated Nov. 12, 2015, Seismic Imaging Systems and Methods Employing Correlation-Based Stacking filed Nov. 7, 2011 Appln. No. 11875413.4, 10 pgs.

Guochang, Liu, et al., "Stacking seismic data using local correlation". Geophysics. Society of Exploration Geophysicists. US. vol. 74. No. 3. May 31, 2009 (May 31, 2009). pp. V43-V48. XP001522546. ISSN: 0016-8033. DOI: 10.1190/1.3085643, p. 2-6.

Hale, Dave, "An efficient method for computing local cross-correlations of multidimensional signals," 2006 CWP Project Review Report, May 18, 2006, p. 1-8, XP055224896, Retrieved from the Internet: URL:https://inside.mines.edu/-dhalejpapers.

Sanchis, Charlotte, "Signal Processing Techniques for the Enhancement of Marine Seismic Data," A dissertation for the degree of Philosophiae Doctor, Nov. 12, 2010, XP05522489, Retrieved from the Internet: URL:http://munin.uit.no/bitstreamj.

\* cited by examiner

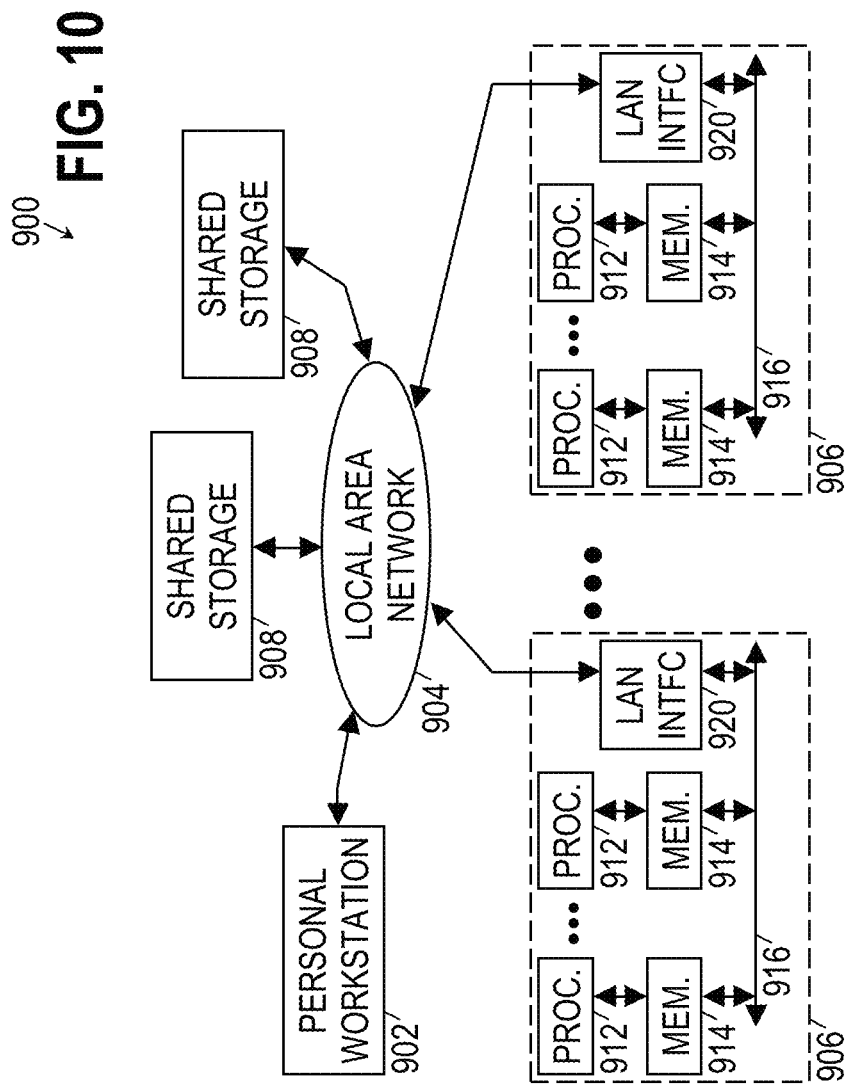

SEISMIC IMAGING SYSTEMS AND METHODS EMPLOYING CORRELATION-BASED STACKING

BACKGROUND

Seismology is used for exploration, archaeological studies, and engineering projects that require geological information. Exploration seismology provides data that, when used in conjunction with other available geophysical, borehole, and geological data, can provide information about the structure and distribution of rock types and their contents. Such information greatly aids searches for water, geothermal reservoirs, and mineral deposits such as hydrocarbons and ores. Most oil companies rely on exploration seismology to select sites in which to drill exploratory oil wells.

Traditional seismology employs artificially generated seismic waves to map subsurface structures. The seismic waves propagate from a source down into the earth and reflect from boundaries between subsurface structures. Surface receivers detect and record reflected seismic waves for later analysis. Though some large-scale structures can often be perceived from a direct examination of the recorded signals, the recorded signals must be processed to remove distortion and reveal finer detail in the subsurface image.

Typically, the recorded signals from each shot (i.e., each firing of the source) are processed to form a depth-based partial image of the subsurface. These partial images generally have a large degree of overlap with each other, providing significant redundancy and an opportunity to improve the image's signal-to-noise ratio by "stacking" the partial images. Stacking traditionally means averaging the partial image values where they overlap. The noise is generally uncorrelated from partial image to partial image, so the averaging operations usually causes the noise to cancel out, particularly where each portion of the final image may be derived from an average of ten or more partial images. In many cases, however, the final image still has an undesirable amount of residual noise.

BRIEF DESCRIPTION OF THE DRAWINGS

Accordingly, there are disclosed in the drawings and the following description specific seismic imaging system and method embodiments employing correlation-based stacking to at least partly address this issue. In the drawings:

FIG. 10 shows an illustrative imaging system.

Figure 1:
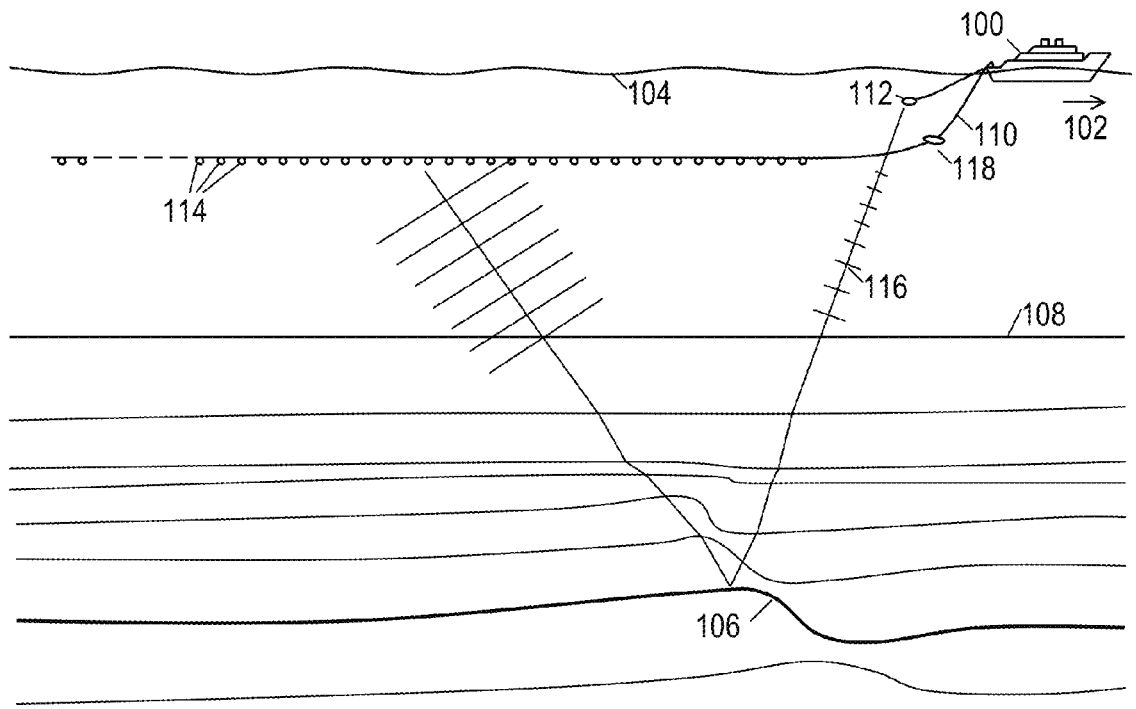
FIG. 1 shows a side view of an illustrative marine seismic survey environment.

It should be understood, however, that the specific embodiments given in the drawings and detailed description thereto do not limit the disclosure, but on the contrary, they provide the foundation for one of ordinary skill to discern the alternative forms, equivalents, and modifications that are encompassed with the given embodiments by the scope of the appended claims.

DETAILED DESCRIPTION

The disclosed systems and methods are best understood in an illustrative context such as a marine seismic survey such as that described here with reference to FIGS. 1-6. At sea, a seismic survey vessel 100 deploys an array of streamers 110 as shown in FIG. 1. Each streamer 110 trails behind the vessel 100 as the vessel moves forward (in the direction of arrow 102), and each streamer includes multiple evenly-spaced receivers 114. Each streamer 110 may further include various programmable positioning devices 118 that steer the streamer out to an operating offset distance from the vessel's path (see FIG. 2) and down to a desired operating depth below the surface 104 (FIG. 1).

Streamers 110 may be up to several kilometers long, and are usually constructed in sections 25 to 100 meters in length having groups of uniformly spaced receivers. Each streamer 110 includes electrical or fiber-optic cabling for interconnecting receivers 114 and the seismic equipment on vessel 100. Data is digitized near the receivers 114 and transmitted to the vessel 100 through the cabling at rates of 7 (or more) million bits of data per second.

As shown in FIG. 1, seismic survey vessel 100 can also tow one or more sources 112. Source 112 may be a vibratory source or an impulse source such as an air gun array, water gun, or explosive. The receivers 114 most commonly used in marine seismology are piezoelectric hydrophones, though other sensor are known and may be used. Data acquisition equipment aboard the vessel 100 acquires the seismic survey data and, in many cases, controls the operation of the sources and receivers.

To image the subsurface structure, source 112 emits seismic waves 116 that penetrate the ocean floor 108 and get partially reflected where there are changes in acoustic impedance, e.g. boundary 106. The reflected waves are detected by receivers 114. The seismic waves 116 that have traveled from source 112 to the subsurface structures and back to receivers 114, are recorded as a function of time and subjected to various processing techniques to provide an image of the subsurface structures. The processed seismic survey data can also reveal various other useful characteristics of the subsurface layers, e.g., fluid interfaces, gas pockets, and stress and fracture orientations.

Figure 2:
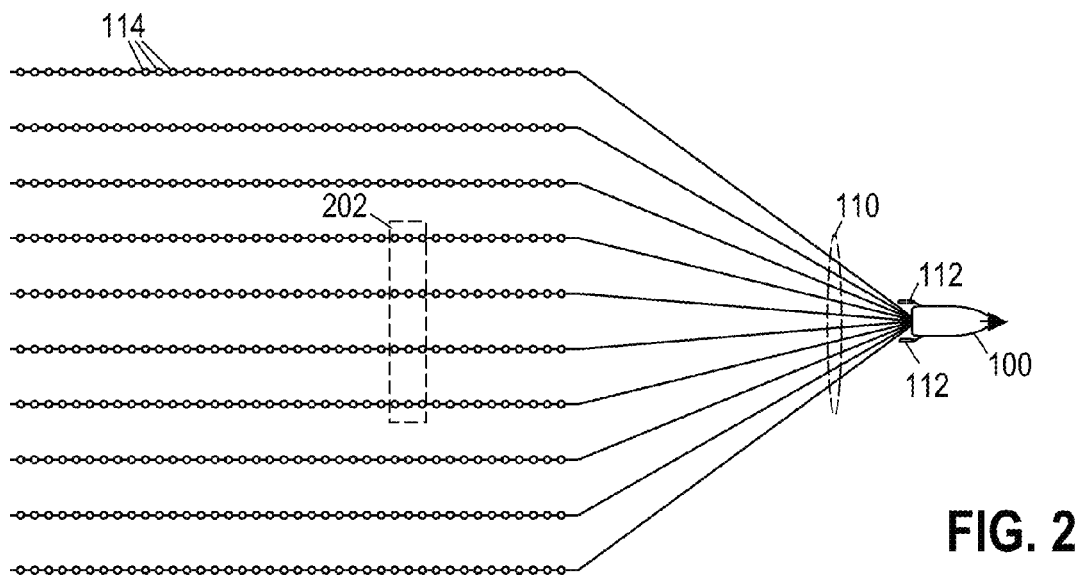
FIG. 2 shows a top view of an illustrative marine seismic survey environment.

FIG. 2 shows an overhead view (not to scale) of the seismic survey vessel 100 towing a set of streamers 110 and two sources 112. As the vessel 100 moves forward, the sources can be triggered alternately in a so-called flip-flop pattern. Programmable positioning devices are used to provide roughly even spacing between the streamers. A selected subset of the receivers 202 is considered for the ensuing discussion.

Figure 3:
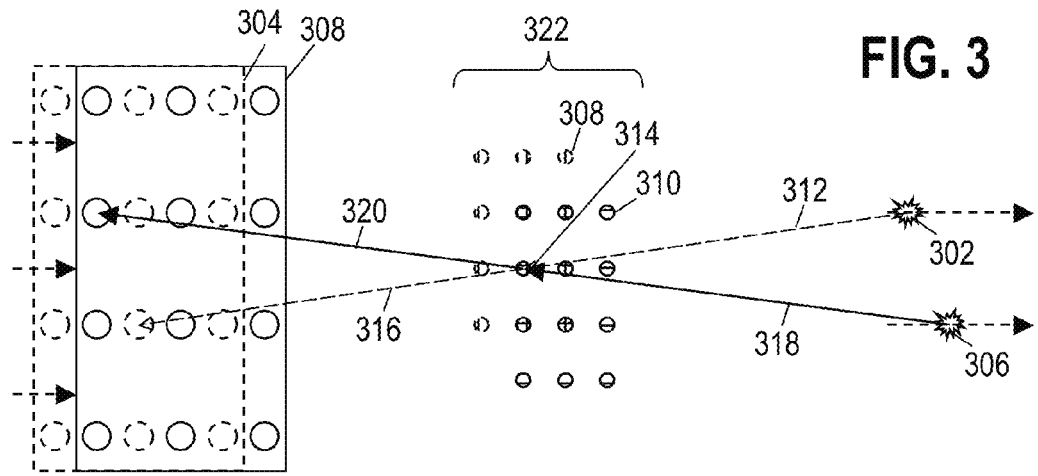
FIG. 3 shows an illustrative midpoint pattern.

FIG. 3 shows an overhead view of illustrative source and receiver positions for two shots. For a first shot, one source is triggered at position 302, and the selected subset of the receiver array is at position 304 (shown in broken outline). For a second shot, a source is triggered at position 306 and the illustrated portion of the receiver array is at position 308 (shown in solid outline). Assuming for the moment that the reflecting subsurface structures are horizontal, the seismic waves that reach each of the twelve receivers are reflected from a position underneath the midpoints between the source and receiver positions. Thus, the first shot produces reflections from beneath the twelve midpoints 308 (shown in broken outline with vertical crosshatching), while the second shot produces reflections from beneath the twelve midpoints 310 (shown in solid outline with horizontal crosshatching).

As one example, vector 312 illustrates propagation of seismic energy from the shot 302 to a midpoint 314, and an equal length vector 316 shows the reflected seismic energy propagating to a receiver position. For the second shot 306, the vectors 318 and 320 show a similar propagation path. Note that midpoint 314 is one of the midpoints that is "hit" by multiple shots, thereby making more signal energy available from these areas when the information from the shots is processed and combined. Seismic surveys (for both land and sea) are generally designed to provide an evenly-distributed grid of midpoints with a fairly high average hit count for each midpoint.

Figure 4:
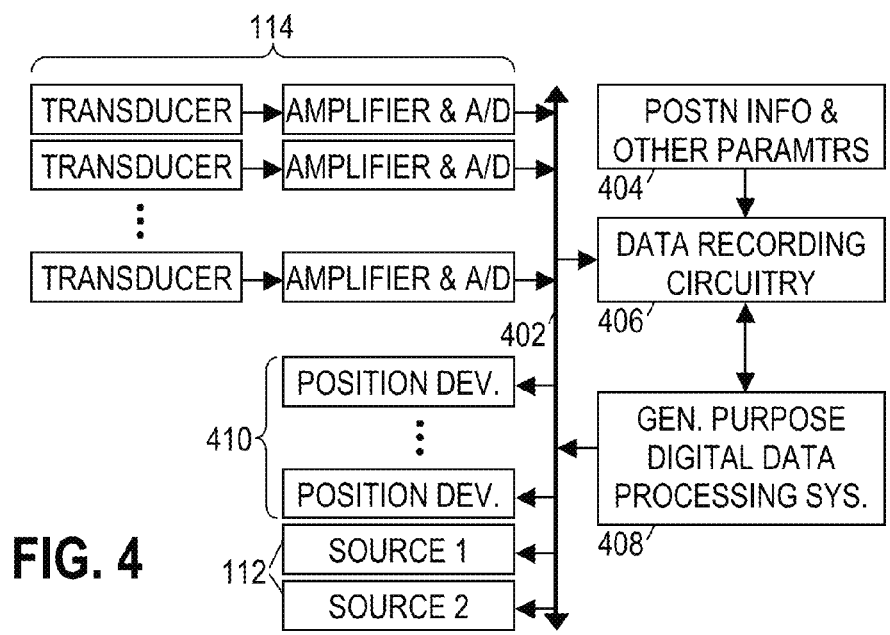
FIG. 4 shows an illustrative seismic survey recording system.

FIG. 4 shows an illustrative seismic survey recording system having the receivers 114 coupled to a bus 402 to communicate digital signals to data recording circuitry 406 on survey vessel 100. Position information and other parameter sensors 404 are also coupled to the data recording circuitry 406 to enable the data recording circuitry to store additional information useful for interpreting the recorded data. Illustratively, such additional information may include array orientation information and velocity information.

A general purpose digital data processing system 408 is shown coupled to the data recording circuitry 406, and is further shown coupled via bus 402 to positioning devices 410 and seismic sources 112. Processing system 408 configures the operation of recording circuitry 406, positioning devices 410, and seismic sources 112. Recording circuitry 406 acquires the high speed data stream(s) from receivers 114 onto a nonvolatile storage medium such as a storage array of optical or magnetic disks. Positioning devices 410 (including programmable diverters and depth controllers) control the position of receivers 114 and sources 112.

The seismic recording system of FIG. 4 may include additional components not specifically shown here. For example, each streamer 110 could have an independent bus 402 for coupling to the data recording circuitry. Processing system 408 includes a user interface having a graphical display and a keyboard or other method of accepting user input, and it can further include a network interface for communicating stored seismic survey data to a central computing facility having powerful computing resources for processing the seismic survey data.

Figure 5:
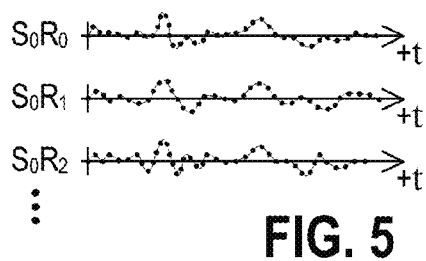
FIG. 5 shows an illustrative set of traces.
Figure 6:
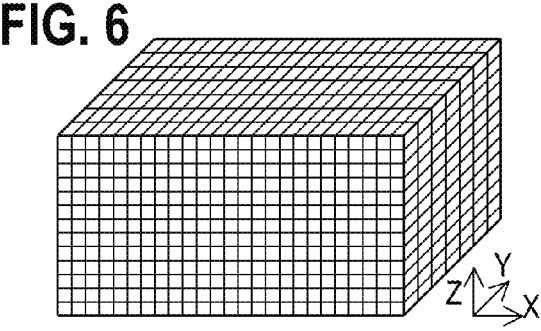
FIG. 6 shows an illustrative data volume in three dimensions.

FIG. 5 shows illustrative seismic traces detected and sampled by receivers 114. Each trace has an associated source position and receiver position, as well as a signal that indicates some measure of seismic wave energy as a function of time (e.g., displacement, velocity, acceleration, pressure), and they are digitized at high resolution (e.g., 24 bits) at a programmable sampling rate. Such traces can be grouped in different ways, and when so grouped, they are called a "gather". For example, a "common midpoint gather" is the group of traces that have a midpoint within a defined region. A "shot gather" is the group of traces recorded for a single firing of the seismic source. A "multi-shot gather" is a group of shot gathers, often including all the traces recorded along a sail line in a marine seismic survey.

The recorded seismic survey data is of little use when maintained in the format of FIG. 5. Although it is possible to plot the various recorded waveforms side by side in a plot that reveals large scale subsurface structures, such structures are distorted and finer structures cannot even be seen. Hence the data is processed to create a subsurface image in two or three spatial dimensions, such as the three dimensional array of data values shown in FIG. 6.

The subsurface image represents some seismic attribute throughout the survey region, usually with a grid of uniformly sized cells, a data value being determined for each cell. Various seismic attributes may be represented, and in some embodiments, each cell may have multiple data values to represent multiple seismic attributes. Examples of suitable seismic attributes include reflectivity, acoustic impedance, acoustic velocity, and density. The uniform grid data format lends itself to computational analysis and visual rendering.

Figure 7:
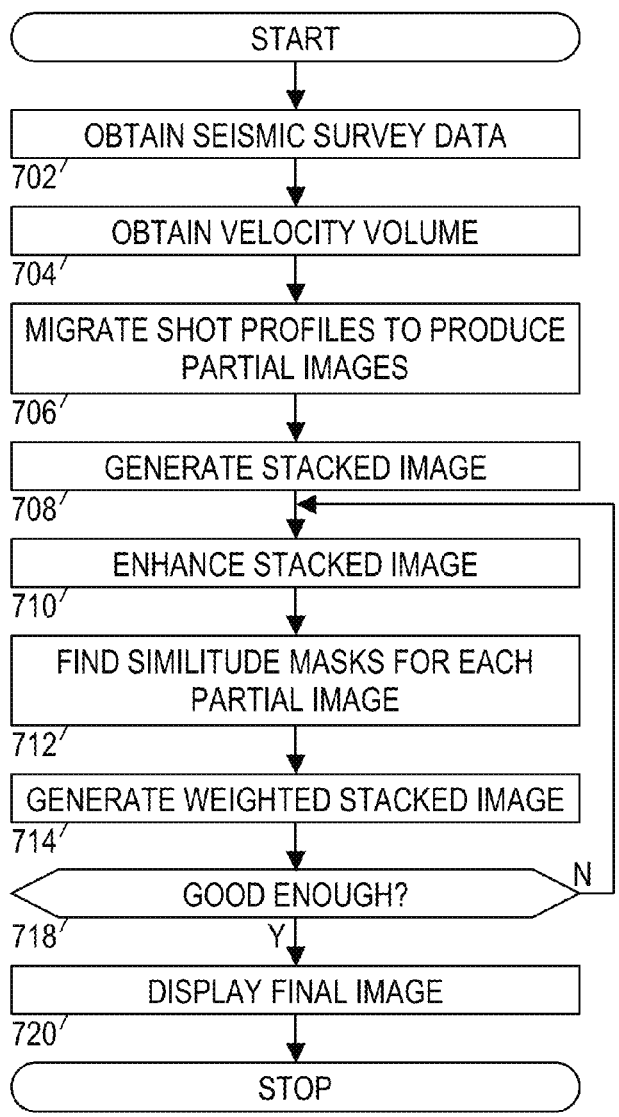
FIG. 7 shows a flowchart of an illustrative seismic imaging method.

With this context, we turn to FIG. 7, which is a flow diagram of an illustrative seismic imaging method. The illustrated method may be implemented as software stored in the memory of a general purpose computer, e.g., computer 408 (FIG. 4) or a central computing facility that is able to access the recorded seismic data. The processors' execution of the software may configure the computer to carry out the given operation, though not necessarily in the strict order given.

In block 702, the computer obtains the seismic survey data from storage. Due to data volume, the data may be retrieved and processed incrementally, e.g., one shot gather at a time.

In block 704, the computer obtains a velocity model of the survey region, i.e., an indication of seismic velocities at each point in the region of interest. The velocity model can be derived from the seismic survey data. See, e.g., Jon F. Claerbout, *Fundamentals of Geophysical Data Processing*, p. 246-56, which is hereby incorporated herein by reference. Alternatively, the velocity volume can be at least partly derived from other sources, e.g., well logs, previous surveys, and/or expert judgment of the analyst. Initial stacking and analysis of the seismic traces generally reveals at least a rough outline of subsurface structures in the region of interest, which can be used in formulating the velocity model. In addition, techniques such as tomographic migration velocity analysis (TMVA) enable the velocity model to be refined based on depth mismatches in common image gathers. The principles of the TMVA technique are described in T. Nemeth, "Tomographic Migration Velocity Analysis on a Salt Model", 1995, UTAM Midyear Report. Some systems may begin with an arbitrary velocity model and rely on TMVA to derive a more suitable velocity model.

The trace gathers represent the wavefield observed at the location of the receiver array. This observation, coupled with the velocity model, justifies the use of a wave equation to extrapolate the wavefield throughout the survey region (i.e., "migration"). A number of migration techniques are known and can be used by the computer in block 706 to obtain a series of partial images from the trace gathers. The fundamentals for this process are described in Chapter 1 of Jon F. Claerbout, *Imaging the Earth's Interior*, Blackwell Scientific Publications, Oxford, 1985. Many wave-equation based migration techniques have been developed in the literature and can be employed to obtain the partial images.

The partial images can be expressed:

$$P(i_x, i_y, i_z, i_p),$$

where $i_p$ is an index ranging from 1 to N, the number of partial images. The spatial indices $i_x, i_y, i_z$ identify grid coordinates in the x, y, and z dimensions. The partial image value at the given grid coordinates represents some seismic attribute such as, e.g., intensity of the reflected energy. In block 708, the partial images are stacked to form a reference image:

$$R(i_x, i_y, i_z) = \frac{1}{N} \sum_{i_p=1}^{N} P(i_x, i_y, i_z, i_p).$$

Note that this is the initial reference image. The reference image may be updated in later iterations of the method as described below. In any event, an optional enhancement operation may be applied to the reference image in block 710. The enhancement may be designed to attenuate noise relative to subsurface features. Illustrative enhancement techniques include FXY deconvolution, bandpass filters, and lowpass filters.

In block 712, each partial image is combined with the reference image to determine a similitude mask, i.e., a measure of the partial image's resemblance to the reference image at each point in the partial image. A variety of suitable measures exists. For example, the similitude mask may be calculated in terms of a correlation coefficient, e.g., $$c(i_x, i_y, i_z, i_p) = \frac{S[P(i_x, i_y, i_z, i_p)R(i_x, i_y, i_z)]}{\sqrt{S[P^2(i_x, i_y, i_z, i_p)]S[R^2(i_x, i_y, i_z)]}},$$

where S[x] is a smoothing operator such as, e.g., $$S[f(i_x, i_y, i_z)] = \sum_{j_x=-l}^{l} \sum_{j_y=-l}^{l} \sum_{j_z=-l}^{l} k(j_x, j_y, j_z) f(i_x + j_x, i_y + j_y, i_z + j_z),$$

with ±l being the summation limits and k( ) being the smoothing weights within the summation window. In one particular embodiment, the smoothing operator has a trapezoidal weight profile, but other profiles can be used. The smoothing weights are preferably normalized, e.g., $$\sum_{j_x=-l}^{l} \sum_{j_y=-l}^{l} \sum_{j_z=-l}^{l} k^2(j_x, j_y, j_z) = 1$$

Another illustrative measure of similitude is semblance, i.e., $$s(i_x, i_y, i_z, i_p) = \frac{1}{2} \frac{S[\{P(i_x, i_y, i_z, i_p) + R(i_x, i_y, i_z)\}^2]}{S[P^2(i_x, i_y, i_z, i_p)] + S[R^2(i_x, i_y, i_z)]}.$$

Whichever resemblance measure is chosen, it is used as the basis for deriving a set of similitude masks $w(i_x, i_y, i_z, i_p)$. A nonlinear relationship may be established to emphasize aspects of partial images with medium-to-strong resemblances to the reference image. As one example:

$$w(i_x, i_y, i_z, i_p) = \begin{cases} c^b(i_x, i_y, i_z, i_p)\{\frac{3}{a^2} c^2(i_x, i_y, i_z, i_p) - \frac{2}{a^3} c^3(i_x, i_y, i_z, i_p)\} & \text{if } a > c(i_x, i_y, i_z, i_p) \\ c^b(i_x, i_y, i_z, i_p) & \text{if } a \leq c(i_x, i_y, i_z, i_p) \end{cases}$$

Figure 8:
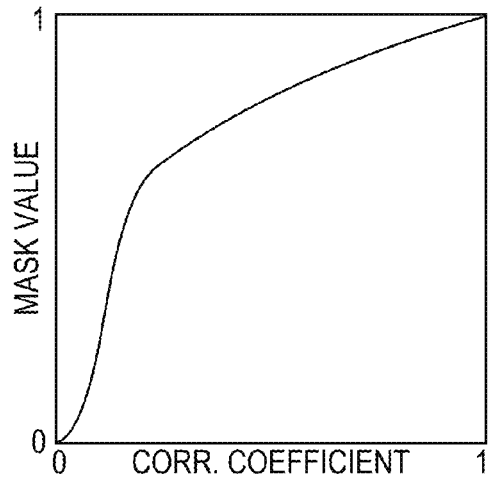
FIG. 8 shows an illustrative nonlinear weighting function.

A graph of this function for a=0.2 and b=0.3 is shown in FIG. 8.

In block 714, the system applies the similitude masks to the partial images to obtain an enhanced image:

$$E(i_x, i_y, i_z) = \frac{1}{N} \sum_{i_p=1}^{N} w(i_x, i_y, i_z, i_p) P(i_x, i_y, i_z, i_p).$$

Figure 9B:
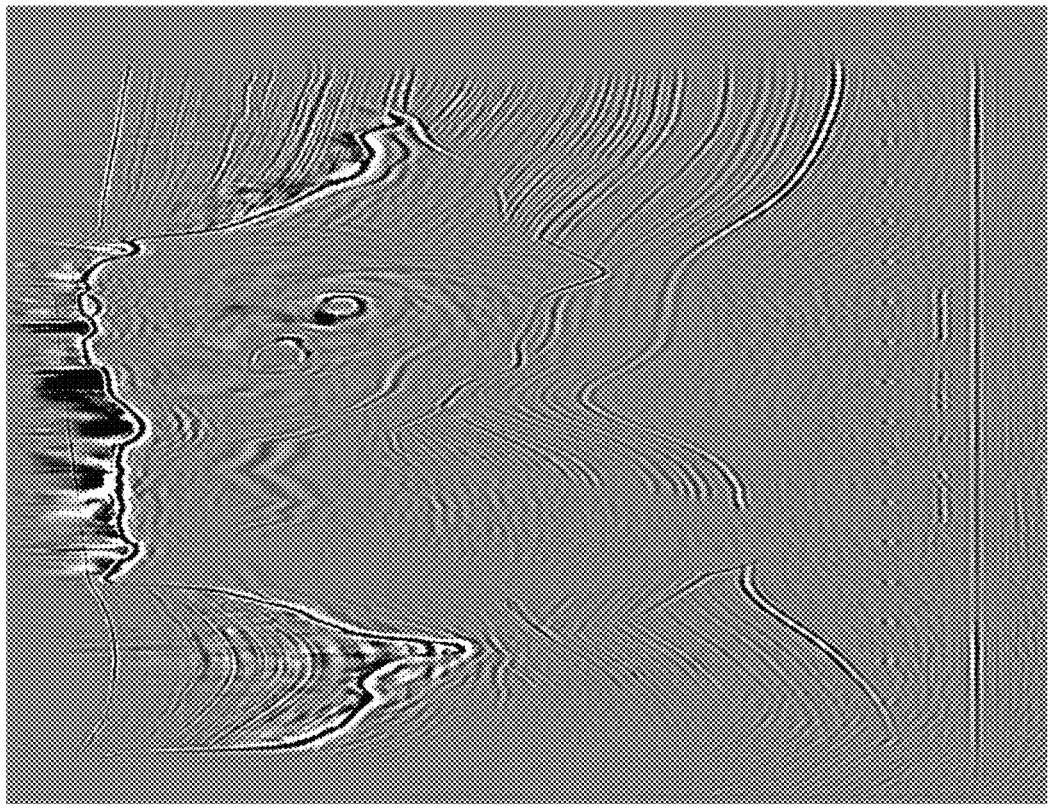
FIGS. 9A-9B compare illustrative stacked images.
Figure 9A:
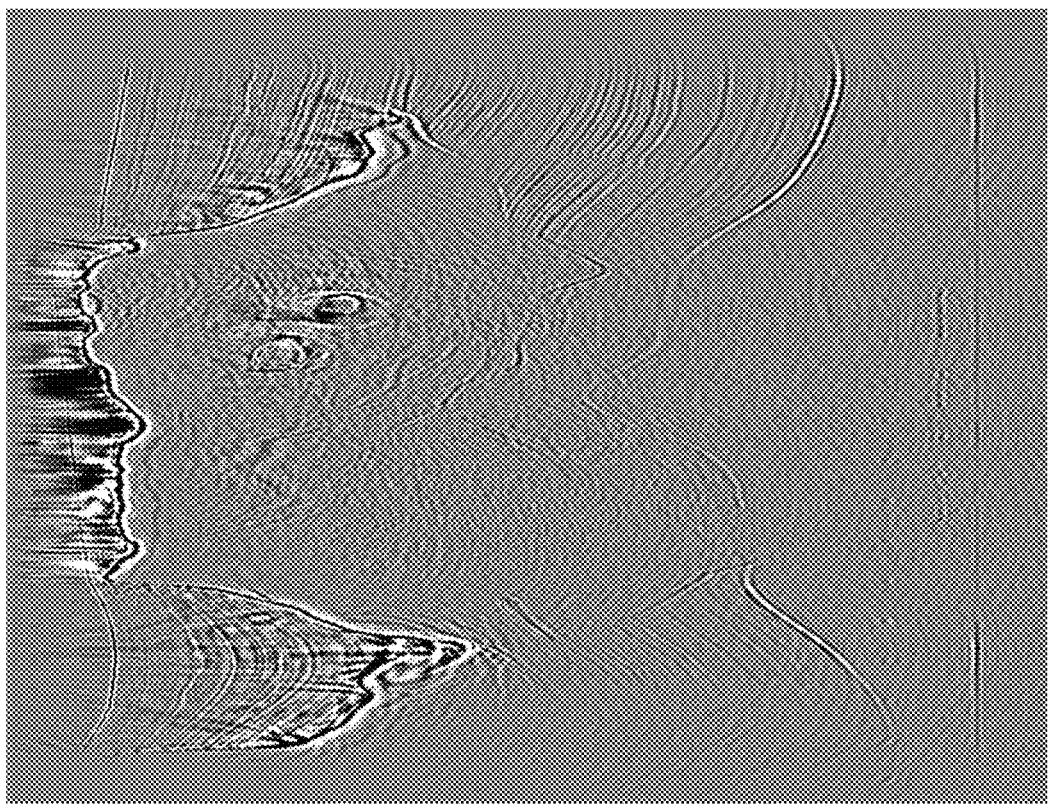

The similitude masks de-emphasize those partial images regions that do not contribute in a meaningful way to the stacked image, thereby reducing the noise level in the image. FIG. 9A shows an illustrative 2D slice through a 3D stacked image volume, which serves as an initial reference image. FIG. 9B shows a corresponding slice through an illustrative enhanced image volume derived using one iteration of the foregoing method. Note that the background "clutter" in the image is significantly reduced.

In block 718, the system determines whether the imaging process is complete, and if not, it repeats blocks 710-718, with the enhanced image from block 714 taken as the new reference image. This can be done in a variety of ways. For example, the system may determine whether a predetermined number of iterations of blocks 710-718 has occurred, or whether a predetermined amount of time has elapsed. The system may compare the enhanced image with the reference image to see if convergence has occurred. Or the system may obtain a measure of image quality, e.g., by estimating noise level, and determining whether a threshold has been reached. As still another example, the system may display the image to a user and offer the option to perform another iteration.

Once the system determines that imaging is complete, the enhanced image is stored for future use by subsequent imaging and/or analysis software. The system may also display a representation of the enhanced image to a user for analysis. The data can be presented as a 2D or 3D image of the subsurface structure.

As previously mentioned, it is contemplated that the operations shown in FIG. 7 may be implemented in the form of software, which can be stored in computer memory, in long-term storage media, and in portable information storage media. It should be noted that illustrative method of FIG. 7 is provided as an explanatory aid. In practice, the various operations shown in FIG. 7 may be performed in different orders and are not necessarily sequential. For example, seismic data processing can benefit substantially from parallelism. In some processing method embodiments, data from different survey regions may be processed independently. In other embodiments, the operations may be "pipelined" so that individual image regions are found and enhanced by operations in the sequence shown, even though the operations are all occurring concurrently. Additional operations may be added to the illustrative method and/or several of the operations shown may be omitted.

FIG. 10 shows an illustrative computer system 900 for performing seismic data processing including seismic imaging using resemblance-based stacking A personal workstation 902 is coupled via a local area network (LAN) 904 to one or more multi-processor computers 906, which are in turn coupled via the LAN to one or more shared storage units 908. Personal workstation 902 serves as a user interface to the processing system, enabling a user to load survey data into the system, to retrieve and view image data from the system, and to configure and monitor the operation of the processing system. Personal workstation 902 may take the form of a desktop computer with a graphical display that graphically shows survey data and images of the survey region, and with a keyboard that enables the user to move files and execute processing software.

LAN 904 provides high-speed communication between multi-processor computers 906 and with personal workstation 902. The LAN 904 may take the form of an Ethernet network.

Multi-processor computer(s) 906 provide parallel processing capability to enable suitably prompt conversion of seismic trace signals into a survey region image. Each computer 906 includes multiple processors 912, distributed memory 914, an internal bus 916, and a LAN interface 920. Each processor 912 operates on an allocated portion of the input data to produce a partial image of the seismic survey region. Associated with each processor 912 is a distributed memory module 914 that stores conversion software and a working data set for the processor's use. Internal bus 916 provides inter-processor communication and communication to the LAN networks via interface 920. Communication between processors in different computers 906 can be provided by LAN 904.

Shared storage units 908 may be large, stand-alone information storage units that employ magnetic disk media for nonvolatile data storage. To improve data access speed and reliability, the shared storage units 908 may be configured as a redundant disk array. Shared storage units 908 initially store a initial velocity data volume and shot gathers from a seismic survey. The (iteratively-updated) common angle image gathers can be temporarily stored on shared storage units 908 for later processing. In response to a request from the workstation 902, the image data can be retrieved by computers 906 and supplied to workstation for conversion to a graphical image to be displayed to a user.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A seismic imaging method that comprises:
    obtaining shot gathers using an array of spaced-apart receivers, a seismic energy source, and position information sensors, wherein each shot gather includes seismic energy measurements corresponding to at least some of the spaced-apart receivers, and wherein each shot gather includes position information for the seismic energy source and for at least some of the spaced-apart receivers;
    obtaining, by at least one processor, partial images of the survey region using the shot gathers;
    stacking, by the at least one processor, the partial images to produce a reference image; and
    combining, by the at least one processor, the partial images to form an enhanced image, wherein the combining includes:
        measuring at each point the reference image's similitude to each of the partial images; and
        determining at each point an enhanced image value from a weighted combination of corresponding values in the partial images, the weighted combination using weights derived from the reference images' similitude at that point to each partial image; and
    displaying, by a display device, a visual representation of at least some portion of the enhanced image.

2. The method of claim 1, wherein said measuring comprises:
    in a window around each point, determining a dot product of the reference image and the partial image.

3. The method of claim 2, wherein the window has a trapezoidal cutoff.

4. The method of claim 2, wherein the weights are derived by:
    normalizing the dot products; and
    scaling the normalized dot products with a nonlinear operation to produce the weight.

5. The method of claim 1, wherein said measuring comprises:
    in a window around each point, summing corresponding values of the reference image and the partial image.

6. The method of claim 1, wherein obtaining the partial images comprises migrating the shot gathers.

7. The method of claim 1, further comprising enhancing the reference image before measuring the reference image's similitude to each of the partial images.

8. The method of claim 1, further comprising taking the enhanced image as a new reference image and repeating the measuring and determining operations using the new reference image.

9. A seismic imaging system that comprises:
    components to obtain shot gathers for a survey region, wherein the components include an array of spaced-apart receivers, a seismic energy source, and position information sensors;
    a memory that stores seismic imaging software and the shot gathers, wherein each shot gather includes seismic energy measurements corresponding to at least some of the spaced-apart receivers, and wherein each shot gather includes position information for the seismic energy source and for at least some of the spaced-apart receivers; and
    at least one processor coupled to the memory to execute instructions in the seismic imaging software for:
        obtaining partial images of a survey region using the shot gathers;
        stacking the partial images to produce a reference image; and
        combining the partial images to form an enhanced image, wherein the combining includes:
            measuring at each point the reference image's similitude to each of the partial images; and
            determining at each point an enhanced image value from a weighted combination of corresponding values in the partial images, the weighted combination using weights derived from the reference images' similitude at that point to each partial image; and
    a display device that displays a visual representation of at least some portion of the enhanced image.

10. The system of claim 9, wherein said measuring comprises:
    in a window around each point, determining a dot product of the reference image and the partial image.

11. The system of claim 10, wherein the weights are derived by:
    normalizing the dot products; and
    scaling the normalized dot products with a nonlinear operation to produce the weight.

12. The system of claim 9, wherein said measuring comprises:
    in a window around each point, determining a semblance between the reference image and the partial image.

13. The system of claim 9, wherein the software further includes instructions for deriving the partial images by migrating shot gathers.

14. The system of claim 9, wherein the software further includes instructions for filtering the reference image before measuring the reference image's similitude to each of the partial images.

15. The system of claim 9, wherein the software further includes instructions for taking the enhanced image as a new reference image and repeating the measuring and determining operations using the new reference image.

* * * * *